United States Patent Office 2,759,908
Patented Aug. 21, 1956

2,759,908

N-PYRIMIDYL ITACONIC AMIDES AND POLYMERS THEREFROM

Gaetano F. D'Alelio, Pittsburgh, Pa., assignor to Koppers Company, Inc., a corporation of Delaware No Drawing. Continuation of application Serial No. 244,704, August 31, 1951. This application October 22, 1953, Serial No. 387,779

18 Claims. (Cl. 260—78)

This invention relates to new monomers and to new polymeric materials derived therefrom and is particularly directed to the polymerization products obtained by polymerizing a mass comprising as a new monomer an N-pyrimidyl itaconic acid amide in the presence or absence of other ethylenic copolymerizable compounds especially acrylonitrile. The invention also relates to compositions of these polymerization products adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing properties.

It has been known for some time that certain copolymers of acrylonitrile may be adapted to the preparation of shaped articles, such as, films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C. or upon spinning from hot solutions. Such crosslinking causes spoliation of material by gelation during storage, embrittlement of fibers, fouling of spinning jets, and other production difficulties.

In accordance with the present invention it has now been found that crosslinking may be avoided and that improvements in dyeing properties of acrylonitrile polymers are obtained by the polymerization of monomeric masses comprising acrylonitrile and an N-pyrimidyl itaconic acid amide with or without other copolymerizable ethylenic compounds. It has been found further that in addition to the fact that the N-pyrimidyl itaconic acid amides yield particularly valuable copolymers with acrylonitrile, they may also be used effectively to form copolymers with other types of copolymerizable ethylenic compounds. It has been found still further that the N-pyrimidyl itaconic acid amides can be polymerized per se to form useful polymers. Thus it has been found that valuable polymerization products may be prepared in accordance with the invention by polymerizing a monomeric mass comprising N-pyrimidyl itaconic acid amide either in the presence or absence of other ethylenic copolymerizable compounds such as acrylonitrile and the other copolymerizable ethylenic compounds listed hereinafter.

The N-pyrimidyl itaconic acid amides used in the invention may be represented by the general formula

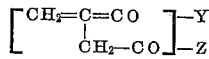

in which Y is selected from the class consisting of the radical Z and the radicals RO— and R₂N— in which R is hydrogen or the alkyl, aryl, aralkyl, alkaryl, or cycloaliphatic groups which may have halogen-, acyloxy-, or alkoxy-substituents or which in case Y is R₂N— the R may be linked together to form with the nitrogen a heterocyclic group and Z is the group

in which R' is selected from the class consisting of hydrogen and alkyl groups, such as, methyl, ethyl, isopropyl, n-butyl, sec-butyl, amyl, hexyl, decyl, and the like, preferably containing less than four carbon atoms and P is a pyrimidine nucleus. The pyrimidine nucleus may be substituted or unsubstituted as in the case of 4-aminopyrimidine, 4 - amino - 2,6 - dimethyl - pyrimidine, 4-amino-2,6-diethyl-5-methyl-pyrimidine and like amino pyrimidines. Other suitable pyrimidines and methods for their manufacture are given by Larchar, U. S. Patent 2,540,826, and Brown, J. Soc. Chem. Ind., 69, 353+ (1950). If substituted it is preferred that the substituents shall be alkyl groups as listed above, but preferably containing less than a total of five carbon atoms.

When the amides used in the practice of the invention contain an ester group or an amide group other than group Z the radical R is selected from the class consisting of methyl, ethyl, propyl, isopropyl, n-butyl, sec-butyl, amyl, hexyl, decyl, chloromethyl, chloroethyl, cyclohexyl, methyl-cyclopentyl, propyl-cyclopentyl, amyl-cyclopentyl, methyl-cyclohexyl, dimethyl-cyclohexyl, chlorocyclohexyl, phenyl, chlorophenyl, xenyl, naphthyl, tolyl, chlorotolyl, xyxyl, ethyl-phenyl, propyl-phenyl, isopropyl-phenyl, benzyl, chlorobenzyl, phenethyl, phenyl-propyl, phenyl-butyl, acetoxy-ethyl, chlorophenoxy-ethyl, acetoxy-propyl, acetoxy-isopropyl, acetoxy-phenyl, acetoxy-benzyl, acetoxy-tolyl, acetoxy-cyclohexyl, ethoxy-propyl, ethoxy-propyl, methoxy-phenyl, methoxy-benzyl, methoxy-tolyl, and methoxy-cyclohexyl, or when Y is R₂N—, forms part of a heterocyclic amino group, such as, the piperidyl, piperazino and morpholino groups.

The amides set forth above may be formed by reacting an amide-forming pyrimidine, i. e., an amino pyrimidine having a replaceable N-hydrogen with itaconic acid, itaconic anhydride, itaconic acid mono esters, itaconic acid mono amides and itaconic acid chloride. When dibasic itaconic acid or the anhydride thereof is used one of the carboxylic groups can be esterified before the amidation. Another amide group similarly may be introduced before the amidation instead of an ester group. Also when the dibasic itaconic acid or anhydride thereof is used, the amidation may be carried either to the mono- or di-amide stages. If carried to the mono-stage only, the remaining carboxylic acid group may then be esterified or amidated (with an ammonia or a different amine as desired. In these and other ways known to those skilled in the art N-pyrimidyl itaconic acid amides may be readily formed.

For the reasons of economy and ease of preparation the methyl ester of N-(2,6-dimethyl-4-pyrimidyl) itaconic acid mono amide is usually preferred and has the formula

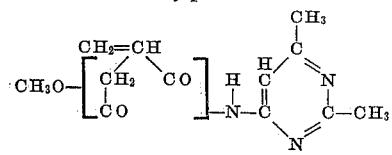

The mono ester is prepared simply by refluxing methanol with itaconic acid in the presence of small amounts of an esterification catalyst such as sulfuric acid, toluene sulfonic acid, cation exchange resins containing sulfonic acid groups etc. The acid ester is then converted to the acid chloride by refluxing with thionyl chloride and then reacted with 4-amino-2,6-dimethyl pyrimidine to produce the methyl ester of N-(2,6-dimethyl-4-pyrimidyl)-amide of itaconic acid. The mono acid N(2,6-dimethyl-4-pyrimidyl) itaconic acid amide is conveniently prepared by reacting itaconic anhydride with the 4-amino-2,6-dimethyl pyrimidine. The acid chloride and anhydride are sufficiently reactive to form the amide merely upon mixing at room temperature. In some cases where the anhydride or acid chloride is not as reactive or in order to get more complete or faster reaction gentle heating may be advantageous. This acid can be readily converted to a sodium or potassium salt and esterified with dimethyl or diethyl sulfate or the corresponding ester.

The proportions of the amide in the polymerization products of the invention may vary over a wide range, ranging from all or substantially all amide down to very small amounts of amide such as may be employed in acrylonitrile polymers to impart dye susceptibility thereto. Although even smaller amounts are somewhat effective, the improvement in susceptibility of acrylonitrile copolymers to dyes becomes particularly noticeable when the amide content of the copolymer is about 0.1 per cent, and the susceptibility increases as the amount of amide is increased. Ordinarily sufficient improvement in dye susceptibility is obtained with amounts of amide ranging up to about 10 or 15 per cent but it may be advantageous for reasons such as in the preparation of ion-exchange polymers or additives to improve dyeing properties to have a major proportion of amide in the acrylonitrile copolymer. In such cases the concentration of amide may range up to or approaching 100 per cent. Within these proportions acrylonitrile copolymers of the invention show great affinity toward many dyes especially basic, acidic, vat, and cellulose acetate dyes.

In addition to the improvements effected in the resulting copolymers, the use of N-pyrimidyl itaconic acid amides has certain other advantages over the use of the corresponding acids. For example, the amides are more soluble in acrylonitrile than the acids. Therefore it is generally easier to get complete copolymerization of the amide with acrylonitrile in solution, emulsion and suspension polymerizations. Still further advantages accrue from the presence of these amides. Thus when non-esterified monoamides are used the copolymers of the invention show high susceptibility to basic dyes.

The acrylonitrile copolymers discussed herein are soluble in N,N-dimethyl acetamide (DMA), N,N-dimethyl formamide (DMF), butyrolactone, ethylene carbonate, and a number of similar solvents, used alone or in conjunction with N,N-dimethyl cyanamide, N,N-dimethyl cyano-acetamide, N,N-dimethyl methoxy-acetamide, methylene dinitrile, methylene di-thiocyanates, formyl caprolactam, formyl morpholine, tetramethylene sulfone, etc. N,N-dimethyl methyl urethane of the formula

(CH$_3$)$_2$NCOOCH$_3$ ethylene carbamate, N-methyl-2-pyrrolidone, etc. can also be used as solvents, either by themselves or with the secondary solvents mentioned above. Nitroalkanes, such as nitromethane, may be used as solvents for such copolymers having no more than about 85 per cent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described by the following examples which illustrate methods of practicing the invention. In these examples and throughout the specification, "parts" and "percentages" are intended to mean parts by weight and percentages by weight.

Example I 24.4 grams (0.2 mol) 4-amino-2,6-dimethyl pyrimidine is admixed with approximately 150 ml. diethyl ether and there is added slowly and with stirring 22.4 grams (0.2 mol) itaconic anhydride. The mixture is refluxed for approximately ½ hour, cooled and the ether evaporated. The residue is recrystallized from absolute ethanol. There is obtained N-(2,6-dimethyl-4-pyrimidyl) itaconic amide acid.

Ultimate analyses for carbon, hydrogen and nitrogen and molecular weight determinations on the product give results which are in close agreement with the theoretical values for N-(2,6-dimethyl-4-pyrimidyl) itaconic amide acid.

Substitution of equivalent quantities of various pyrimidines in the foregoing procedure for the 4-amino-2,6-dimethyl pyrimidine there used yields the various mono-pyrimidyl amides of itaconic acid of this invention which are characterized by ultimate analyses and molecular weight determinations as in the foregoing procedure.

Example II 44.6 grams (0.2 mol) N-(2,6-dimethyl-4-pyrimidyl) itaconic amide acid (prepared as in Example I) is dissolved in a minimum amount of water and 8.0 grams (0.2 mol) sodium hydroxide added slowly to form the sodium salt. The water is evaporated and the residue is admixed with approximately 150 ml. diethyl ether. There is added slowly and with stirring 25.0 grams (0.2 mol) dimethyl sulfate. The ether is evaporated and the residue recrystallized from absolute ethanol. There is obtained mono-methyl N-(2,6-dimethyl-4-pyrimidyl) itaconic amide.

Ultimate analyses for carbon, hydrogen and nitrogen and molecular weight determinations on the product give results which are in close agreement with the theoretical values for mono-methyl N-(2,6-dimethyl-4-pyrimidyl) itaconic amide.

Substitution of the various mono-amides of Example I or diethyl sulfate respectively in the foregoing procedure for the N-(2,6-dimethyl-4-pyrimidyl) itaconic amide acid and dimethyl sulfate there used yields the various methyl and ethyl esters of the mono-amides of itaconic acid of this invention which are characterized by ultimate analyses and molecular weight determinations as in the foregoing procedure.

Example III 44.6 grams (0.2 mol) N-(2,6-dimethyl-4-pyrimidyl) itaconic amide acid is admixed with approximately 150 ml. diethyl ether and 29.7 grams (0.25 mol) thionyl chloride and the mixture refluxed for approximately ½ hour. The ether is evaporated and there is obtained the acid chloride.

This acid chloride is added slowly and with stirring to a mixture of 10.0 grams (0.2 mol) dimethyl amine and 150 ml. diethyl ether in a flask equipped with a reflux condenser. After the addition of the acid chloride the mixture is refluxed for approximately ½ hour and the ether is then evaporated. The residue is dissolved in water and shaken with 29.0 grams (0.125 mol) silver oxide to remove the chloride ion. The mixture is filtered and the filtrate evaporated to dryness. The residue is recrystallized from absolute ethanol. There is obtained N-dimethyl-N'-(2,6-dimethyl-4-pyrimidyl)-itaconic di-amide.

Ultimate analyses for carbon, hydrogen, and nitrogen and molecular weight determinations on the product give results which are in close agreement with the theoretical values for N-dimethyl-N'-(2,6-dimethyl-4-pyrimidyl)-itaconic diamide.

Substitution of equivalent quantities of the various mono-amides of Example I or dialkyl amines, respectively, in the foregoing procedure for N-(2,6-dimethyl-4-pyrimidyl) itaconic amide acid and dimethyl amine there used yields the various unsymmetrical diamides of this invention which are characterized by ultimate analyses and molecular weight determinations as in the foregoing procedure.

Example IV 48.3 grams (0.2 mol) of the acid chloride of Example III is added slowly and with stirring to a mixture of 24.4 grams (0.2 mol) 4-amino-2,6-dimethyl pyrimidine and 150 ml. diethyl ether in a flask equipped with a reflux condenser. After addition of the acid chloride, the mixture is refluxed for approximately ½ hour and the ether is then evaporated. The residue is dissolved in water and shaken with 29.0 grams (0.125 mol) silver oxide to remove the chloride ion. The mixture is filtered and the filtrate evaporated to dryness. The residue is recrystallized from absolute ethanol. There is obtained N,N'-(2,6-dimethyl-4-pyrimidyl) itaconic diamide.

Ultimate analyses for carbon, hydrogen and nitrogen and molecular weight determinations give results which are in close agreement with the theoretical values for N,N'-(2,6-dimethyl-4-pyrimidyl) itaconic diamide.

Substitution of equivalent quantities of the various acid chlorides obtained in Example III or various amino pyrimidines in the foregoing procedure for the particular acid chloride and amino pyrimidine there used yields the various diamides of itaconic acid of this invention which are characterized by ultimate analyses and molecular weight determinations as in the foregoing procedure.

Example V

Five polymers of acrylonitrile are prepared from the following monomer compositions:

| Polymer | Acrylonitrile, parts | N-(2,6-dimethyl-4-pyrimidyl) itaconic amide acid, parts |
| --- | --- | --- |
| A | 100 | |
| B | 99.9 | 0.1 |
| C | 95 | 5.0 |
| D | 90 | 10.0 |
| E | 80 | 20.0 |

The 100 parts of monomer or monomer mixture is, in each case, slowly added over a period of less than an hour to 750–1000 parts of distilled water at 30–50° C. containing dissolved therein one part of ammonium persulfate, 0.6 to 1.5 parts of sodium bisulfite and 0.5 parts of sodium dodecyl-benzene sulfonate. The reaction is continued for 2–6 hours, at which time a yield of about 90 per cent solid polymer is precipitated. The resulting polymers have molecular weights over 10,000. Each polymer is dissolved in N,N-dimethyl acetamide or butyrolactone and a film cast from each solution.

A water solution of methylene blue dye (a basic dye) is prepared by making a paste of the dye and then diluting to a 1 per cent by weight dye solution. This dye solution is kept boiling for one hour while the aforementioned films are immersed therein for one hour. The dyed films are then removed and separately subjected to washing with boiling water for one hour, the boiling water being changed frequently to remove the desorbed dye. The unmodified polyacrylonitrile film shows only a light tint, whereas the mono-N-(2,6-dimethyl-4-pyrimidyl) itaconic amide acid copolymers are a deep and dense shade. Identical films, cold-drawn and heat-treated, show dyeing characteristics similar to the undrawn films.

Fibers are spun from the same N,N-dimethyl acetamide or butyrolactone solutions either by dry spinning or by wet spinning, into glycerine baths. The fibers are substantially freed from solvent and dried. After cold-drawing the dried fibers 600–900 per cent at 120–145° C. and subsequently heat-treating them at 150° C. for one hour, the fibers are given the same dyeing and washing treatment described above with the same results as for the films a light tint being acquired by the unmodified polyacrylonitrile fibers and a deep and dense color being given to the itaconate copolymer fibers.

Example VI

Five polymers of acrylonitrile are prepared from the following monomer compositions:

| Polymer | Acrylonitrile, parts | Mono-methyl N-(2,6-dimethyl-4-pyrimidyl) itaconic amide, parts |
| --- | --- | --- |
| A | 100 | |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 0.5 to 1 part sodium dodecyl benzene sulfonate, 1.0 part of ammonium persulfonate, 0.5 part of sodium bisulfite, and 100 parts of monomer or monomer mixture. The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer isolated by filtration.

The polymer is then washed with water and with methyl alcohol. A portion of the polymer is dissolved in dimethyl formamide or butyrolactone and a film cast from the solution. The film is washed entirely free of solvent and stretched at a ratio of about 8:1 in a glycerine bath at 135 to 145° C. The film is then washed in water and dyed in a bath containing for each part of film 0.05 part of 1,5-diamino-4,8-dihydroxyanthraquinone-3-sulfonic acid, 0.03 part sulfuric acid and 50 parts water (50:1 bath-film ratio) at boiling temperature for one hour. The film is then removed and washed with water and scoured for 15 minutes in a 0.4 per cent soap solution at 85° C. Whereas the unmodified polyacrylonitrile when treated in this manner has little or no color, all of the copolymers were dyed to a deeper blue shade.

Fibers are spun from the same solutions either by dry spinning, or by wet spinning. The fibers are substantially freed from solvent and dried. After cold-drawing the dried fibers 600–900 per cent at 120–145° C., and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, tetramethyl urea, butyrolactone, ethylene carbonate, formyl morpholine, etc.

Instead of the monomethyl itaconate ester amides of the above example, various other monoesters of N-(2,6-dimethyl-4-pyrimidyl) itaconic amide acid can be used, such as ethyl, propyl, isopropyl, butyl, isobutyl, tertiary-butyl, hexyl, tolyl, phenyl, naphthyl, cyclopentyl, cyclohexyl, benzyl, phenethyl, etc. Likewise the monoesters of the other n-pyrimidyl itaconic amide acids disclosed above may be used.

Example VII

Five parts of the copolymer fiber D of Example V was dyed to a deep green shade using the vat color dimethoxy-dibenzanthrone at 70° C. in a bath containing 0.5 part of dye, 0.25 part sodium hydroxide, 0.5 part sodium hydrosulfite and 100 parts of water (20:1 bath-fiber ratio). After the first 15 minutes of heating 0.25 part of Glauber's salt was added. The sample was then oxidized in a 0.5 per cent sodium dichromate 1.0 per cent acetic acid at 70° C. for 30 minutes in a 20:1 bath-fiber ratio. The dyed fiber was then scoured in a 0.5 per cent boiling soap solution. A sample of yarn prepared from the unmodified polyacrylonitrile and dyed under the same conditions resulted in a light shade of color.

When 1,5-di-p-anisoylamino-4,8-dihydroxy-anthraquinone is used as the vat dye, the copolymer fiber is dyed a strong violet color.

The procedures of this example and of Example V can also be used with the various amide acids set forth above instead of the N-(2,6-dimethyl-4-pyrimidyl) itaconic amide acid.

*Example VIII*

The procedure of Example V is repeated for the polymerization of the following monomer compositions:

| Polymer | Acrylo-nitrile, parts | Vinyl Chloride, parts | Monomethyl N-(2,6-di-methyl-4-pyrimidyl) itaconic amide, parts | Copolymer Soluble in— |
|---|---|---|---|---|
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO$_2$Me. |
| E | 57 | 40 | 3 | NO$_2$Me. |
| F | 37 | 60 | 3 | Acetone. |

Sometimes copolymers D and E, when dissolved in nitromethane may have gelled, partially dissolved particles known as fisheyes. In such cases, the solubility may be improved by the addition of small amounts of materials which are good solvents for acrylonitrile polymers, such as butyrolactone, ethylene carbonate, dimethyl formamide, dimethyl acetamide, tetramethyl urea, etc. In addition, certain materials which are relatively poor solvents for polyacrylonitrile, such as diethyl formamide, diethyl acetamide, diethyl propionamide, etc., may be added to improve the solubility. Also, when acetone solutions of copolymer F contain gelled particles, clarification of the solution may be effected by the addition of nitromethane, diethyl formamide, diethyl acetamide, etc.

Dyeing tests of these copolymers show improvements in dyeing susceptibility similar to those of Example V.

The procedure of this example can also be used with the various other monoesters set forth above.

*Example IX*

The procedure of Example V is repeated for the polymerization of the following monomer compositions:

| Polymer | Acrylo-nitrile, parts | Styrene, parts | Monomethyl N-(2,6-dimethyl-4-pyrimidyl) itaconic amide, parts |
|---|---|---|---|
| A | 88.0 | 7 | 5.0 |
| B | 78.0 | 17 | 5.0 |
| C | 68.0 | 27 | 5.0 |
| D | 58.0 | 37 | 5.0 |

Dyeing tests of these copolymers show improvements in dye susceptibility similar to Example V. In place of styrene, various styrene derivatives may be used, such as alpha-methyl-styrene; nuclear-substituted chloro-styrenes, i. e., ortho-, meta-, and para-chloro-styrenes, dichloro-styrenes, for example, the 2,3-, 2,4-, 2,5-, 2,6-, 3,4-, and 3,5-dichloro-styrenes; trichloro-styrenes; cyano-styrenes, such as ortho-, meta-, and para-cyano-styrenes, dicyano-styrenes, nuclear substituted alkyl-styrenes, such as mono- and di-methyl-styrenes, mono- and di-ethyl-styrenes, mono- and di-isopropyl-styrenes, aryl-substituted styrenes, i. e., para-phenyl-styrene, etc.; cycloaliphatic-substituted styrenes, such as para-cyclohexyl styrenes; fluoro-styrenes, such as ortho-, meta-, para-fluoro-styrene, difluoro-styrenes, etc.; trifluoromethyl-styrenes, such as ortho-, meta-, and para-trifluoromethyl-styrenes, di-(trifluoromethyl)-styrenes, and various other styrenes or mixtures of any number of these with each other or with styrene.

The procedure of this example can also be used with the various other monoesters set forth above.

*Example X*

The procedure of Example V is repeated for the polymerization of the following monomer compositions:

| Polymer | Acrylo-nitrile, parts | Vinyli-dene chlo-ride, parts | Mono-methyl N-(2,6-di-methyl-4-pyrimidyl) itaconic amide, parts | Copolymer Soluble in— |
|---|---|---|---|---|
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and vinylidene chloride of at least 85 per cent in the polymer molecules, only the more active solvents, such as butyrolactone, ethylene carbonate, N,N-dimethyl acetamide, N,N-dimethyl formamide, N,N,N',N'-tetramethyl urea, etc., can be used as solvents. The above copolymers dye more readily and thoroughly than similar copolymers containing no N-pyrimidyl itaconic acid amide.

The procedure of this example can also be used with the various other monoesters set forth above.

*Example XI*

The procedure of Example V is repeated for the polymerization of the following monomer compositions:

| Polymer | Acrylo-nitrile, parts | Vinylidene chloride, parts | Vinyl chloride, parts | Monomethyl N-(2,6-dimeth-yl-4-pyrimidyl) itaconic amide, parts |
|---|---|---|---|---|
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example V.

The procedure of this example can also be used with the various other monoesters set forth above.

Instead of copolymerizing the N-pyrimidyl itaconic acid amides with the acrylonitrile, they can be polymerized independently to produce polymers, and the prepared polymer used to modify polyacrylonitrile or other acrylonitrile copolymers. The acrylonitrile polymers may be blended with up to 10 per cent or more of the poly-N-pyrimidyl itaconic acid amide without serious loss in the physical and chemical properties of the resulting dyed structures. The following example is illustrative.

*Example XII*

Polymeric N-pyrimidyl itaconic amide acid is prepared substantially in accordance with the procedure of Example V. A 10 per cent solution of this polymer is prepared in dimethyl formamide and added to a dimethyl formamide solution of polyacrylonitrile, containing 20 per cent polymer, so that a composition consisting of 90 parts of polyacrylonitrile and 10 parts of the amide is obtained. The solution is heated to 130° C. after which the solution is filtered. Films and fibers prepared from this mixture are dyed in accordance with the process of Example V, and satisfactorily dyed, shaped articles are obtained. The unmodified polyacrylonitrile without the addition of the itaconic amide showed little or no dye retention.

Instead of using a homopolymer of an N-pyrimidyl itaconic amide, copolymers of the itaconic amide, such as polymers D and E of Example VI, can be used as modifiers for the unmodified homopolymers of acrylonitrile. For example, polymer E of Example VI, which consists of 80 parts of acrylonitrile and 20 parts of monomethyl N-(,6-dimethyl-4-pyrimidyl) itaconic amide, has excellent compatibility with homopolymers of acrylonitrile. In many cases, it is desirable to use the copolymers of the N-pyrimidyl itaconic amides, which have even a higher ratio of the itaconic amide, as for example, 50 to 70 parts of the itaconic amide copolymerized with acrylonitrile or methacrylonitrile. In other cases, the copolymers of itaconic amides with other monomers are satisfactory such as, for example, copolymers of styrene, vinyl chloride, vinylidene chloride, alpha-methyl-styrene, etc.

When it is desired to modify an acrylonitrile copolymer such as the copolymer of acrylonitrile and styrene or the copolymers of acrylonitrile and other copolymerizable ethylenic compounds, it is usually desirable to use as modifiers copolymers containing the same structural units as are present in the acrylonitrile copolymer. Thus as there are present in the acrylonitrile copolymer, structural units derived from the acrylonitrile and styrene, it is desirable to have present in the modifying copolymer structural units derived from styrene in addition to those derived from acrylonitrile and the amide. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The di-N-pyrimidyl itaconic amides of the structure

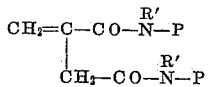

in which R' and P are as given above, may be used instead of the monoamide in the practice of this invention.

The polymerization products of the present invention have in the polymer molecule a plurality of repeating units of the formula

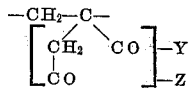

in which Y and Z are as indicated above and will contain additional repeating units of the formula

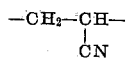

when the amide is copolymerized with acrylonitrile.

In addition, the copolymers may contain any number of repeating units of the type obtained by the copolymerization of amides of the invention with one or more copolymerizable ethylenic compounds, such as, for example, vinylidene chloride, vinyl chloride, styrene, alpha-methyl-styrene, methacrylonitrile, fumaronitrile, beta-cyano-acrylamide and methyl beta-cyanoacrylate.

As previously indicated, the solvent resistance of such copolymers as contain one or more monomer units in addition to those formed by the acrylonitrile and the amides of the invention is affected by the type and proportion of copolymerizing monomer or monomers used to replace part of the acrylonitrile. For example, copolymers containing small amounts of the amide units may contain various proportions of such monomer units as obtained from vinylidene chloride, methacrylonitrile, fumaronitrile, and beta-cyano-acrylamide without considerable reduction in solvent resistance. Replacement of acrylonitrile units in the copolymers by vinyl chloride, styrene and alphamethyl-styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile-amide type copolymer will decrease much more when a monomer having relatively weak secondary bonding forces, such as styrene or ethylene is used to replace part of the acrylonitrile than when a monomer having relatively strong bonding forces, such as methacrylonitrile, fumaronitrile, beta-cyano-acrylamide, methyl beta-cyanoacrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which may also be present in the polymerizable masses for copolymerization with the amides used in the practice of this invention include one or more of the following: acrylates, e. g., methyl acrylate; methacrylates, e. g., methyl methacrylate; acrylamides; methacrylamides; vinyl esters, such as vinyl acetate; maleates, such as dimethyl and diethyl maleates; fumarates, such as dimethyl and diethyl fumarates; itaconic diesters, such as dimethyl and diethyl itaconates; itaconamide; vinyl halides, such as vinyl fluoride, tetrafluoroethylene, trifluorochloroethylene; vinyl aryls, such as vinyl naphthalenes and substituted styrenes as listed in Example V, etc.

The polymerization products of this invention may be prepared by various polymerization systems, such as emulsion, suspension, mass and solution polymerizations. In addition to the monomers, the polymerizable mass may also contain other materials such as catalysts, e. g., peroxides, such as benzoyl peroxide, naphthyl peroxides, phthalyl peroxide, tertiary-butyl hydroperoxide, hydrogen peroxide, cyclohexyl hydroperoxide, tertiary-butyl perbenzoate, etc., azo catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 may be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers may be made from the solutions of the copolymers of this invention by dry spinning, as in the preparation of cellulose acetate fibers, or by wet spinning, as in the preparation of viscose rayon. In wet spinning, the solution of copolymer may be spun into a substance which is a non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc., may be used as a precipitating bath for N,N-dimethyl acetamide, N,N,N',N'-tetramethyl urea, butyrolactone, ethylene carbonate and other solvent compositions of these copolymers. The extruded fibers, from which substantially all of the solvent has been removed in the spinning step, about 1–10 per cent remaining in the shaped article, may then be cold-drawn about 100–900 per cent, preferably about 300–600 per cent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention may be molecularly oriented, especially if there is no more than 15 per cent of amide in the copolymer molecule. This is true when the major portion of the copolymer is acrylonitrile, for example, 85 per cent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and an amide according to the invention, the proportion of acrylonitrile in the copolymers may be much less than 85 per cent without destroying the capacity for molecular orientation. Molecularly oriented, cold-drawn, shaped articles of particular usefulness are prepared from copolymer compositions containing in the polymer molecules 60–99.9 per cent acrylonitrile, 0.1–15 per cent advantageously 0.1–5 per cent the amide, with or without one or more monomers of the class consisting of vinylidene chloride, vinyl chloride, styrene, alpha-methyl-styrene, methacrylonitrile, fumaronitrile, beta-cyano-acrylamide and methyl beta-cyano-acrylate, the effects of the presence of the monomers of this class being noticeable when the monomer is present in the polymer molecule in amounts of one per cent or more.

The polymerization products of this invention show great affinity for the acetate, basic, acidic and vat dyes. The cellulose acetate dyes which are effective with these polymerization products are mainly amino-anthraquinone derivatives. The basic dyestuffs toward which these polymerization products show great affinity are preferably those which contain amido, alkylamido, or ammonium groups, such as —NH₂, —N(CH₃)₂, —N(C₂H₅)₂, —NHC₆H₅, —N(CH₃)₃OH, etc. and which may also be used in the form of their salts, i. e. the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavine T, Saffranine and Bismarck Brown. The cellulose acetate dyes which are effective with these polymerization products are mainly amino-anthraquinone derivatives, basic azo compounds and other basic substances, such as the Duranol, Dispersol, Sericol, etc. dyestuffs. A number of other acidic dyes that can be used are anthranilic acid→1-(4'-sulfophenyl), 3-methyl-5-pyrazolone; 1,5-diamino-4,8-dihydroxyanthraquinone-3-sulfonic acid; 1-amino-naphthalene-4-sulfonic acid→alpha-naphthol-4-sulfonic acid; the sodium salt of sulfanilic acid→aniline→2-benzoyl-amino-5-naphthol-7-sulfonic acid; the sodium salt of 4,4'-diaminostilbene-2,2'-disulfonic acid→(phenol)₂ ethylated; 1,5-diamino-4,8-dihydroxyanthraquinone-3-sulfonic acid; dye prepared by diazotizing 1-amino-naphthalene-4-sulfonic acid and coupled with alpha-naphthol-4-sulfonic acid; the sodium salt of (m-aminobenzoic acid→o-anisidene) phosgenated; the sodium salt of (2-naphthol-6,8-disulfonic acid←benzidine→phenol) ethylated; dimethoxy-dibenzanthrone; and 1,5-di-p-anisoylamino-4,8-dihydroxyanthraquinone.

From the molecularly orientable copolymers of this invention fibers may be prepared having improved dyeing properties, low shrinkage in boiling water, sometimes as low as 3 to 5 per cent or less of the cold-drawn or stretched article, good heat resistance, and tensile strength in the order of 4 to 6 grams per denier. Moreover, these properties make the fibers desirable in the manufacture of hosiery and for such all-purpose fabrics as used for blouses, shirts, suits, etc.

This application is a continuation of my presently pending application Serial Number 244,704, filed August 31, 1951.

What is claimed is:

1. As a new monomeric composition N-(2,6-dimethyl-4-pyrimidyl) itaconamic acid.

2. A polymerization product obtained by polymerizing a mass comprising the methyl ester of N-(2,6-dimethyl-4-pyrimidyl) itaconic acid monoamide.

3. A polymerization product obtained by polymerizing a mass comprising N,N'-di-(4-pyrimidyl) itaconic acid diamide.

4. The polymerization product of claim 2 which contains in the polymer molecule a plurality of repeating units of the formula

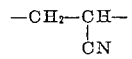

5. A cold-drawn fiber having molecular orientation, said fiber comprising a copolymer of about 60–98.9 per cent by weight acrylonitrile, about 0.1 to 5 per cent by weight N-(2,6-dimethyl-4-pyrimidyl) itaconic acid amide, and about 1 to 39.9 per cent by weight of a compound selected from the class consisting of vinyl chloride, vinylidene chloride, styrene, alpha-methyl-styrene, methacrylonitrile, fumaronitrile, meta-cyano-acrylamide, and methyl-beta-cyano-acrylate.

6. A cold-drawn fiber having molecular orientation, said fiber comprising a copolymer of about 60–98.9 per cent by weight acrylonitrile, about 0.1 to 5 per cent by weight N-(2,6-dimethyl-4-pyrimidyl) itaconic acid amide and about 1 to 39.9 per cent by weight vinylidene chloride.

7. A cold-drawn fiber having molecular orientation, said fiber comprising a copolymer of about 60–98.9 per cent by weight acrylonitrile, about 0.1 to 5 per cent by weight N-(2,6-dimethyl-4-pyrimidyl) itaconic acid amide and about 1 to 39.9 per cent by weight vinyl chloride.

8. A cold-drawn fiber having molecular orientation, said fiber comprising a copolymer of about 60–98.9 per cent by weight acrylonitrile, about 0.1 to 5 per cent by weight N-(2,6-dimethyl-4-pyrimidyl) itaconic acid amide and about 1 to 39.9 per cent by weight styrene.

9. A cold-drawn fiber having molecular orientation, said fiber comprising a copolymer of about 60–98.9 per cent by weight acrylonitrile, about 0.1 to 5 per cent by weight of an amide having the following formula

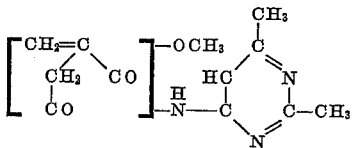

and about 1 to 39.9 per cent by weight of a compound selected from the class consisting of vinyl chloride, vinylidene chloride, styrene, alpha - methyl - styrene, methacrylonitrile, fumaronitrile, beta-cyano-acrylate.

10. A polymeric composition having in the polymer molecule a plurality of repeating units having the formula selected from the class consisting of

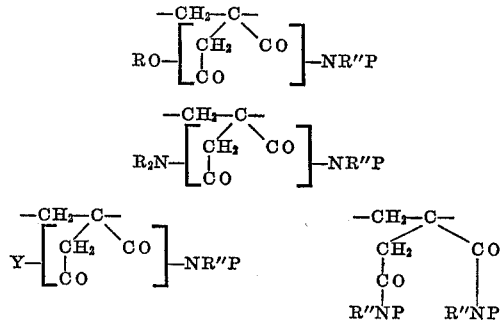

in which Y is selected from the class consisting of piperidyl, piperazino and morpholino; in which R is selected from the class consisting of hydrogen and alkyl, aryl, aralkyl, alkaryl, and cycloaliphatic groups, R″ is selected from the group consisting of hydrogen and alkyl groups containing not more than 3 carbon atoms, and P is selected from the radicals consisting of 4-pyrimidyl and alkyl substituted 4-pyrimidyl in which the total number of alkyl carbon atoms is less than 5.

11. A shaped article comprising a copolymer of acrylonitrile and the methyl ester of N-(2,6-dimethyl-4-pyrimidyl) itaconic acid amide, said copolymer having a molecular weight of at least 10,000.

12. A cold-drawn fiber having molecular orientation, said fiber comprising a copolymer of acrylonitrile and the methyl ester of N-(2,6-dimethyl-4-pyrimidyl) itaconic acid amide, said copolymer having a molecular weight of at least about 10,000 and containing in the polymer molecule no more than about 15 per cent by weight of said amide.

13. The polymerization product of 99.5–50 parts acrylonitrile and 0.1–50 parts of the methyl ester of N-(2,6-dimethyl-4-pyrimidyl) itaconamic acid.

14. A homopolymer of N-pyrimidyl itaconic amide.

15. As a new monomeric composition of matter a compound having a formula selected from the class consisting of

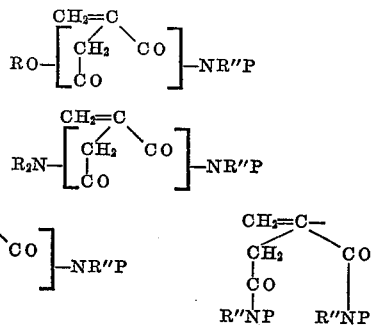

in which Y is selected from the class consisting of piperidyl, piperazino and morpholino; in which R is selected from the class consisting of hydrogen and alkyl, aryl, aralkyl, alkaryl and cycloaliphatic groups, R″ is selected from the group consisting of hydrogen and alkyl groups containing not more than 3 carbon atoms, and P is selected from the radicals consisting of 4-pyrimidyl and alkyl substituted 4-pyrimidyl in which the total number of alkyl carbon atoms is less than 5.

16. Mono - methyl N - (2,6 - dimethyl - 4 - pyrimidyl) itaconic amide.

17. N - dimethyl - N′ - (2,6 - dimethyl - 4 - pyrimidyl) - itaconic diamide.

18. N,N′ - (2,6 - dimethyl - 4 - pyrimidyl) - itaconic diamide.

No references cited.